Sept. 11, 1934.   G. F. WEATON ET AL   1,973,590
RECOVERY OF ZINC, LEAD, TIN, AND CADMIUM VALUES
Filed July 7, 1931   2 Sheets-Sheet 2
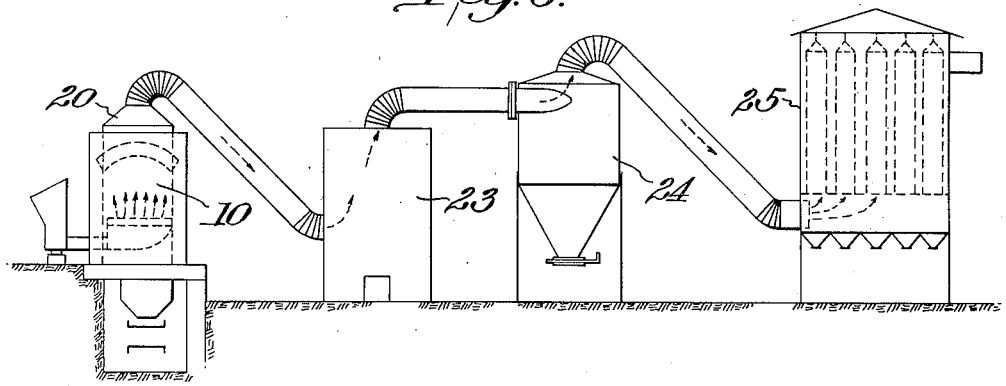
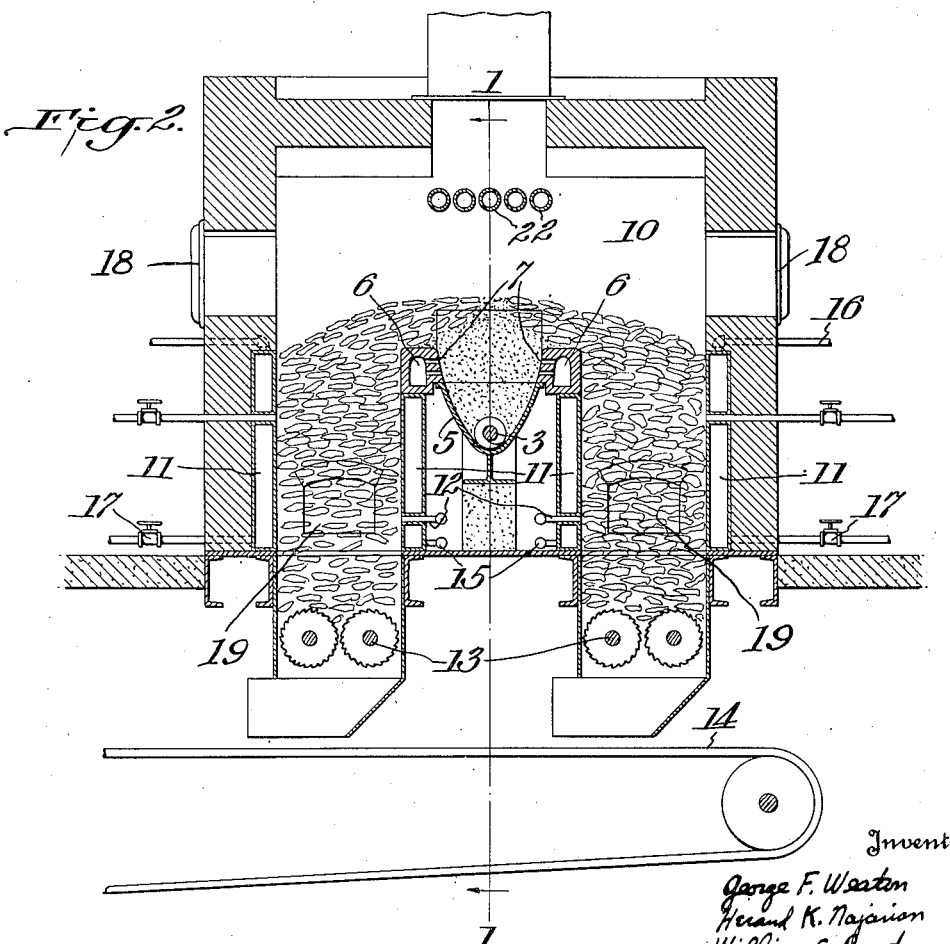

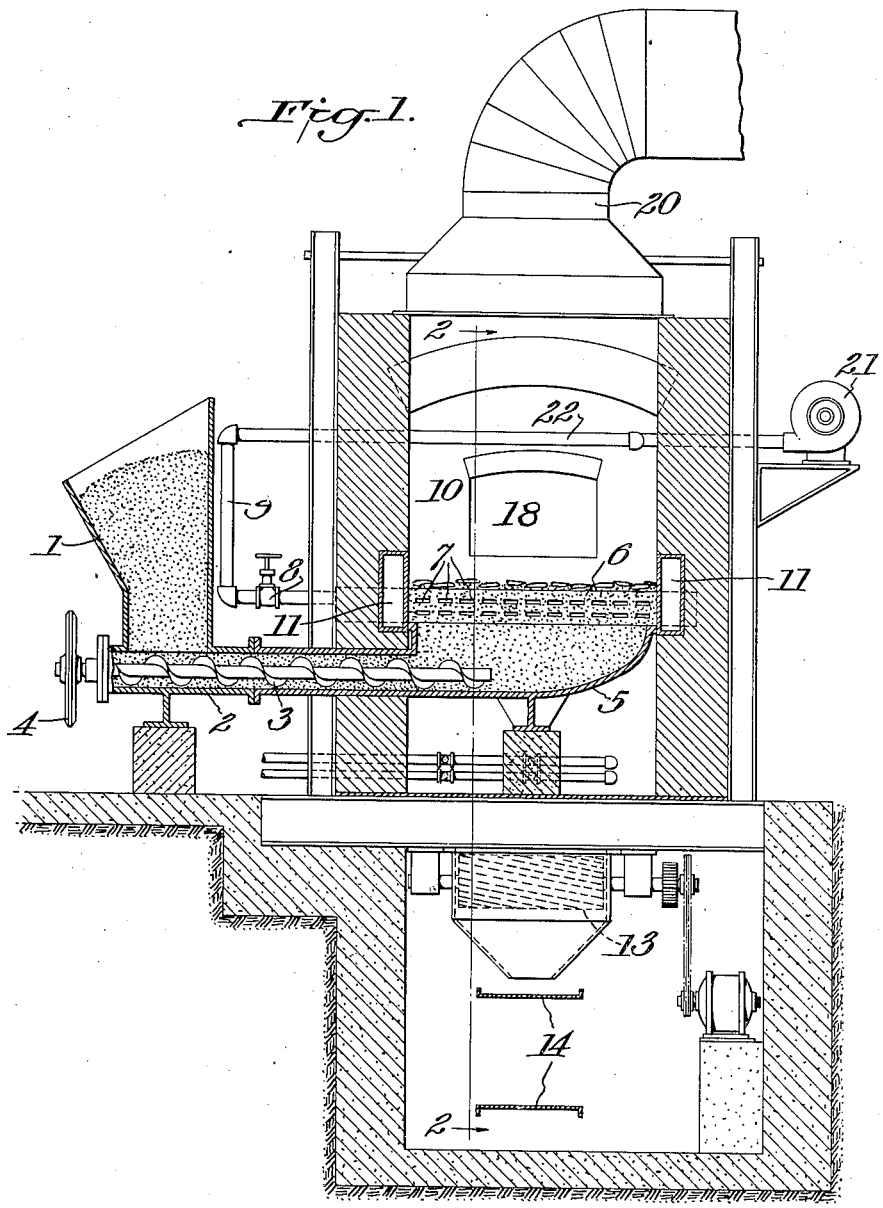

Patented Sept. 11, 1934

1,973,590

UNITED STATES PATENT OFFICE

1,973,590

RECOVERY OF ZINC, LEAD, TIN, AND CADMIUM VALUES

George F. Weaton, Herand K. Najarian, and William C. Dowd, Beaver, Pa., assignors to St. Joseph Lead Company, New York, N. Y., a corporation of New York Application July 7, 1931, Serial No. 549,302

8 Claims. (Cl. 23—148)

The invention relates to a process for the recovery of volatilizable metal values from metalliferous materials. A principal object of the invention is to provide a method whereby metal values may be recovered from materials containing volatilizable metals or metal compounds, and particularly from low-grade materials which require a process of low operating cost for the economic recovery of the metal values contained therein.

Briefly the invention comprises passing a mixture of the metalliferous material and a fuel, for example coke, upwardly through a reducing and/or volatilizing zone under the action of a blast of air, passing the residue laterally and downwardly out of the reducing and volatilizing zone, oxidizing the gaseous product issuing from said reducing and volatilizing zone immediately above said zone, removing the products of combustion and separating the metal values therefrom. The air blast supplied to said reducing and volatilizing zone may be preheated, in which case the preheating is preferably effected by means of the heat of combustion of the gaseous products. It is also desirable to pass a further blast of air upwardly through the downwardly passing residue. This further blast of air serves to remove any remaining volatilizable values from the residue, and to cool the residue to some extent. By allowing this additional blast of air to mingle with the gaseous products coming from the reducing and volatilizing zone, a combustion supporting medium for the completion of the oxidation of the said gaseous products is advantageously provided.

The invention is particularly adapted to the production of zinc oxide, either lead free or as the so-called "leaded" zinc oxides, from low grade materials such as residues from the smelting of zinciferous ores, flue dust from the calcining or roasting of zinciferous ores, and the like. The invention will be described by way of example, as applied to the production of zinc oxide from zinciferous materials, with particular reference to the accompanying drawings, in which:

Fig. 1 is a sectional elevation on the line 1—1 of Fig. 2, of a form of apparatus suited to carrying the invention into effect;

Fig. 2 is a sectional elevation, on the line 2—2 of Fig. 1, of the same form of apparatus; and Fig. 3 is a diagrammatic layout of plant suitable for carrying the invention into effect.

A charge consisting of about 70 parts of zinciferous material containing, for example, about 15 percent of zinc, and about 30 parts of carbonaceous material is mixed and placed into the hopper 1. The charge is then forced through tube 2, at any desired rate, by the screw 3 which may be rotated at any desired speed by sprocket or gear 4. It is obvious that a ram, plunger, plates or other devices may be substituted for the screw 3. The screw 3 discharges the charge from the tube 2 into hearth chamber 5, at or near the bottom. The pressure exerted upon the materials in hearth chamber 5 by the incoming charge from tube 2 causes the charge to rise in the hearth chamber at a more or less uniform rate. The hearth chamber 5 is a more or less rectangular metal vessel whose upper portion consists of hollow tuyère chamber 6 partially or wholly surmounting the hearth chamber. This tuyère chamber 6 has one or more superimposed rows of openings 7 at suitable intervals for the admission of air or gas for combustion supplied under pressure through connecting pipe 9, controlled by gate or valve 8. These openings 7 may also extend for a considerable distance from tuyère chamber 6, and may take the form of a flat grate through which the air is forced. Blower 21 furnishes the necessary blast of air or gas, the air or gas first passing through preheater 22, thence through pipe 9 and control gate 8 to the tuyère chamber 6. The hearth chamber 5 is set in combustion chamber 10, which is the usual type of refractory furnace well known to the art, except that, in order that the slags and residues may be readily removed from the combustion zone without undue labor and the ores and carbonaceous materials completely worked off, cooling is provided for the lower portion of the combustion chamber 10. For the purpose of illustration, water jackets 11 are shown in the figures. It is obvious that tubes or other forms of cooling means may be substituted. At suitable intervals openings or tuyères 12 are incorporated through these water jackets for the admission of air in the required amounts to complete the volatilization of the metallic constituents of the charge, as well as the working off of the contained carbonaceous content. The object of the water-cooled combustion chamber sides is to prevent fused and viscous slags and residues from adhering to the side walls, which are then difficult to remove, and to effect the progressive cooling of these slags prior to their contact with the clinker grinders 13 which break up the clinker in such a manner that it may be readily conveyed to the residuum disposal. The clinker grinder 13 is operated at a variable speed as desired and serves to regulate the passage and cooling of the refuse from the furnace, as well as the depth of the active smelting zinc above the tuyères 12. The refuse discharged by clinker grinder 13 is conveniently disposed of by conveyor 14. Water for the water-cooled walls is introduced through pipes 15 and the exit is through overflow pipe 16. The flow is regulated, in order to operate at the desired temperature, by the valves 17. Access to the main part of the combustion chamber is obtained by doors 18, and to lower section by doors 19. The products of combustion comprising the volatile constituents of metals and gases from the carbonaceous materials are discharged through outlet 20, from which they pass through the usual settling chamber 23, cyclone 24, and finally to the bag house 25, in the manner usual and well known to the art, as shown in plan and elevation in Fig. 3.

The charge passing from the hopper 1, through tube 2, and propelled by screw or ram 3 into hearth chamber 5 and rising in the hearth chamber at a speed proportional to the rate of introduction of new charge, is heated by the radiation and conduction of heat produced by the combustion of the charge at the level of and immediately above the tuyère openings 7. This zone is a zone of active reduction of the oxidized portion of the charge due to the generation of reducing gases, such as carbon monoxide, methane, etc., produced by the action of oxygen on incandescent carbon and hydrocarbon in the charge and its reaction at the favorable temperature obtained upon the oxidized portion of the charge. As the charge continues to be forced upward in hearth chamber 5, its temperature is constantly increased. Above the tuyère openings 7 the temperature is sufficient to vaporize the volatilizable portions of the charge undergoing reduction. As these vapors ascend and come into the zone of intense reaction near and at the surface of the charge they are oxidized, forming metallic oxide. The heat of reaction due to the formation of these metallic oxides, together with the heat generated by the combustion of the carbonaceous portion of the charge, serves to fuse the slag-forming elements of the charge and the temperature at which this takes place, approximately 1400° C., is sufficient to volatilize the remaining metals recoverable by volatilization. These metallic vapors and oxides continue their upward passage through the incandescent bed of partially consumed carbonaceous materials, which acts to burn out any combustible materials forced along by the intense blast of air from the tuyère openings 7. As the oxides leave the zone of incandescent and emerge into the large combustion chamber, heavier solid particles of undesirable materials and any agglomerated oxides will be redeposited in the combustion chamber, the oxides being revolatilized, undesirable elements finally passing off with the slags. The high grade oxides pass upward and out through outlet 20. Fig. 3 illustrates the further travel of the oxides through the settling chamber 23, cyclone 24, ducts, and finally to the bag house 25, where the oxides are recovered and the gases pass off through the filter bags, as is well known in the art.

The residues, which are principally in the form of slags, pass outwardly from the zone of intense reaction through the mass of partially consumed charge and over the tuyère chamber 6, gradually working downward together with a portion of the partially consumed carbonaceous materials of the charge. This downward movement is controlled by the speed of the clinker grinder 13, which is regulated with reference to the zone of the complete oxidation of the remaining zinciferous and carbonaceous materials, and the cooling of the residues by the adjacent water cooled walls 11. Air is admitted through tuyères 12, in the desired quantity necessary to complete the oxidation of the remaining portion of the charge at the desirable, predetermined zone.

The air supplied to tuyère chamber 6 is preheated by the exit gases and heat generated by the oxidation of metallic constituents of the charge within the combustion chamber 10, which increases the efficiency of the process, decreases the amount of fuel required, and maintains greater stability of the relative zones of reduction and oxidation.

It will of course be apparent that the form of apparatus shown and described for the purpose of illustrating the invention may be widely varied without departing from the spirit of the invention. The invention while particularly described with reference to the recovery of zinc oxide from low grade zinciferous materials is also applicable to the recovery of volatilizable metals and metal compounds in general and may be applied for example to the treatment of materials containing lead, tin, cadmium and the like.

We claim:—

1. A process for the recovery of volatile metals of the group consisting of zinc, lead, tin and cadmium from metalliferous materials containing the same which comprises passing a mixture of the metalliferous material and a fuel upwardly, maintaining said mixture at ignition temperature and subjecting it to the action of a blast of air, whereby a reduction and volatilization zone is produced, passing the residue laterally and downwardly out of the zone of reduction and volatilization, oxidizing the gaseous product issuing from said zone immediately above said zone, removing the products of combustion and separating the metal values therefrom.

2. A process for the recovery of volatile metals of the group consisting of zinc, lead, tin and cadmium from metalliferous materials containing the same which comprises passing a mixture of the metalliferous material and a fuel upwardly, maintaining said mixture at ignition temperature and subjecting it to the action of a preheated blast of air, whereby a reduction and volatilization zone is produced, passing the residue laterally and downwardly out of the zone of reduction and volatilization, oxidizing the gaseous product issuing from said zone immediately above said zone, removing the products of combustion and separating the metal values therefrom.

3. A process for the recovery of volatile metals of the group consisting of zinc, lead, tin and cadmium from metalliferous materials containing the same which comprises passing a mixture of the metalliferous material and a fuel upwardly, maintaining said mixture at ignition temperature and subjecting it to the action of a preheated blast of air, whereby a reduction and volatilization zone is produced, passing the residue laterally and downwardly out of the zone of reduction and volatilization, passing a further blast of air upwardly through said downwardly passing residue, oxidizing the gaseous product issuing from said zone immediately above said zone, at least in part by means of said further blast of air, removing the products of combustion and separating the metal values therefrom.

4. A process as defined in claim 1 wherein the blast of air is preheated by means of the combustion of the gaseous product issuing from the reduction and volatilization zone.

5. A process for the production of zinc oxide from zinciferous materials which comprises passing a mixture of the metalliferous material and a fuel upwardly, maintaining said mixture at ignition temperature and subjecting it to the action of a blast of air, whereby a reduction and volatilization zone is produced, passing the residue laterally and downwardly out of the zone of reduction and volatilization, oxidizing the gaseous product issuing from said zone immediately above said zone, removing the products of combustion and separating the zinc oxide therefrom.

6. A process for the production of zinc oxide from zinciferous materials which comprises passing a mixture of the metalliferous material and a fuel upwardly, maintaining said mixture at ignition temperature and subjecting it to the action of a preheated blast of air, whereby a reduction and volatilization zone is produced, passing the residue laterally and downwardly out of the zone of reduction and volatilization, oxidizing the gaseous product issuing from said zone immediately above said zone, removing the products of combustion and separating the zinc oxide therefrom.

7. A process for the production of zinc oxide from zinciferous materials which comprises passing a mixture of the metalliferous material and a fuel upwardly, maintaining said mixture at ignition temperature and subjecting it to the action of a preheated blast of air, whereby a reduction and volatilization zone is produced, passing the residue laterally and downwardly out of the zone of reduction and volatilization, passing a further blast of air upwardly through said downwardly passing residue, oxidizing the gaseous product issuing from said zone immediately above said zone, at least in part by means of said further blast of air, removing the products of combustion and separating the zinc oxide therefrom.

8. A process as defined in claim 5 wherein the blast of air is preheated by means of the combustion of the gaseous product issuing from the reduction and volatilization zone.

GEORGE F. WEATON.
HERAND K. NAJARIAN.
WILLIAM C. DOWD.